United States Patent
Mansour et al.

(10) Patent No.: US 9,755,723 B1
(45) Date of Patent: *Sep. 5, 2017

(54) IMPROVING UPLINK PERFORMANCE FOR A BEAM-FORMING ANTENNA CONFIGURATION

(71) Applicant: Sprint Communications Company L.P., Overland Park, KS (US)

(72) Inventors: Nagi A. Mansour, Arlington, VA (US); Pinal Tailor, Ashburn, VA (US); Aaron Pawlowski, Sterling, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 127 days.

This patent is subject to a terminal disclaimer.

(21) Appl. No.: 14/808,292

(22) Filed: Jul. 24, 2015

Related U.S. Application Data (63) Continuation of application No. 14/517,444, filed on Oct. 17, 2014, now Pat. No. 9,124,333.

(51) Int. Cl.
*H04B 7/08* (2006.01)
*H04W 72/04* (2009.01)

(52) U.S. Cl.
CPC ........ *H04B 7/0837* (2013.01); *H04W 72/046* (2013.01)

(58) Field of Classification Search
CPC .. H04B 7/0404; H04B 7/0413; H04B 7/0837; H04B 7/0842; H04B 7/0874; H04W 72/046
See application file for complete search history.

(56) References Cited

U.S. PATENT DOCUMENTS

| | | | |
|---|---|---|---|
| 6,469,680 B1 * | 10/2002 | Kelliher | H04B 7/10 343/725 |
| 6,650,910 B1 * | 11/2003 | Mazur | H04B 7/086 342/375 |
| 9,124,333 B1 * | 9/2015 | Mansour | H04B 7/0874 |

* cited by examiner

*Primary Examiner* — Leon Flores (57) ABSTRACT

A method, system, and medium are provided for improving uplink performance of an antenna array configured for downlink beam forming. Beam forming requires an antenna element spacing that results in correlated downlink signals. Uplink reception preferably uses an element spacing such that uplink signals are uncorrelated. For an eight-element antenna configured for beam forming, using eight-branch combining to produce a single resultant signal is thus less than optimal. In an embodiment, non-adjacent elements in the antenna array, which receive uncorrelated signals, may be combined in pairs with two-branch combining. The four resultant signals may then be combined using four-branch combining to provide a single resultant signal.

18 Claims, 6 Drawing Sheets

IMPROVING UPLINK PERFORMANCE FOR A BEAM-FORMING ANTENNA CONFIGURATION

CROSS-REFERENCE TO RELATED APPLICATIONS

This application is a continuation of U.S. application Ser. No. 14/517,444, filed Oct. 17, 2014, entitled "Improving Uplink Performance For A Beam-Forming Antenna Configuration,", which is herein incorporated by reference in its entirety.

SUMMARY

A high-level overview of various aspects of some embodiments of the invention are provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter. In brief and at a high level, this disclosure describes, among other things, ways to use an antenna array configured for downlink beam forming to receive uplink signals. For example, an eight-element antenna array that is optimally configured for downlink beam forming is not optimally configured for eight-branch maximum ratio combining of uplink signals, because a different element spacing is needed for each. Changing the element spacing compromises beam forming and uplink reception. Better uplink reception may be achieved without compromising downlink beam forming by using other configurations for combining the uplink signals.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of some of these acronyms:

BS Base Station
BSC Base Station Controller
CDMA Code Division Multiple Access
EVDO Evolution-Data Optimized
GIS Geographic Information Systems
GPRS General Packet Radio Service
GSM Global System for Mobile Communications
IRC Interference Rejection Combining
LTE Long-Term Evolution
MIMO Multiple-Input and Multiple-Output
PDA Personal Data Assistant
PGW Packet Data Network Gateway
RSRP Reference Signal Receive Power
SGW Serving Gateway
TDMA Time Division Multiple Access
X-pol Cross-Polarized Further, various technical terms are used throughout this description. An illustrative resource that fleshes out various aspects of these terms can be found in Newton's Telecom Dictionary, 27th Edition (2013).

Some embodiments of the invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. As used herein, computer-readable media include media implemented in any way for storing information, but do not include signals per se. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

An antenna array configured for downlink beam forming is not configured for optimal reception of uplink signals. For beam forming, it is preferable that the elements in an antenna array be spaced closely enough that when a signal is transmitted via the array, the output signals from adjacent antenna elements are correlated. A spacing of one-half wavelength of the carrier or thereabout is typically used, represented as $\lambda/2$, where $\lambda$ is the wavelength. For uplink reception, however, a wider spacing is preferred. Better uplink reception may be achieved by using a combining technique, such as maximum ratio combining, to combine uplink signals (i.e., a signal transmitted by a mobile device and received separately at each antenna element) into a single signal. However, the uplink signals need to be uncorrelated, thus the need for a wider spacing between the antenna elements. A spacing of λ/2, which is good for beam forming, is not ideal for combining uplink signals because the received signals are correlated. A typical spacing used when combining uplink signals is λ, i.e., one wavelength of the carrier, or greater. For an antenna array comprising eight elements spaced for beam forming, eight-branch maximum ratio combining of the signals provides less than optimal performance compared to the same technique when applied to an antenna array having elements that are more widely spaced. Some antenna arrays compromise the spacing in an attempt to optimize an antenna for both downlink beam forming and uplink receive diversity by using a spacing of 0.65λ. Such spacing, while improving uplink performance somewhat, results in less than ideal performance for both downlink beam forming and uplink reception. In an embodiment, when utilizing an eight-element antenna array configured for downlink beam forming, uplink reception may be improved by using two-branch combining of signals from nonadjacent array elements, then using four-branch combining to combine the four resultant signals from the two-branch combining.

In a first aspect, computer-readable media are provided for performing a method of combining uplink signals received via a plurality of elements in an antenna array. For each of a plurality of element pairs, two-branch combining is utilized to combine uplink signals from elements within the element pair. Each element pair contains two non-adjacent elements that each receives an uplink signal. A resultant two-branch-combined uplink signal is thus provided for each of the plurality of element pairs. N-branch combining is utilized to combine the resultant two-branch-combined uplink signals, wherein n is the number of element pairs.

In a second aspect, a method is provided for combining uplink signals received via a plurality of elements in an antenna array, where the elements are configured for downlink beam forming. A two-branch combining technique is utilized to combine pairs of uncorrelated uplink signals received from non-overlapping pairs of elements in the antenna array. The combining provides a plurality of n resultant two-branch-combined signals corresponding respectively to the non-overlapping pairs of elements, where n is the number of resultant two-branch-combined signals. An n-branch combining technique is utilized to combine the plurality of n resultant two-branch-combined signals, providing an n-branch-combined signal. The n-branch-combined signal is utilized to receive uplink communication.

In a third aspect, a base station is provided. The base station includes an antenna array and a signal processing module. The antenna array includes a plurality of antenna elements, and is configured for downlink beam forming. The antenna array is also configured to provide a received uplink signal from each antenna element. The signal processing module is configured to perform two-branch combining of pairs of uplink signals received from non-overlapping pairs of nonadjacent elements in the antenna array. The two-branch combining provides n resultant two-branch-combined uplink signals that correspond respectively to the non-overlapping pairs of nonadjacent elements, where n is the number of non-overlapping pairs of nonadjacent elements. The signal processing module is also configured to perform n-branch combining of the n resultant two-branch-combined uplink signals to provide an n-branch-combined uplink signal.

Figure 1:
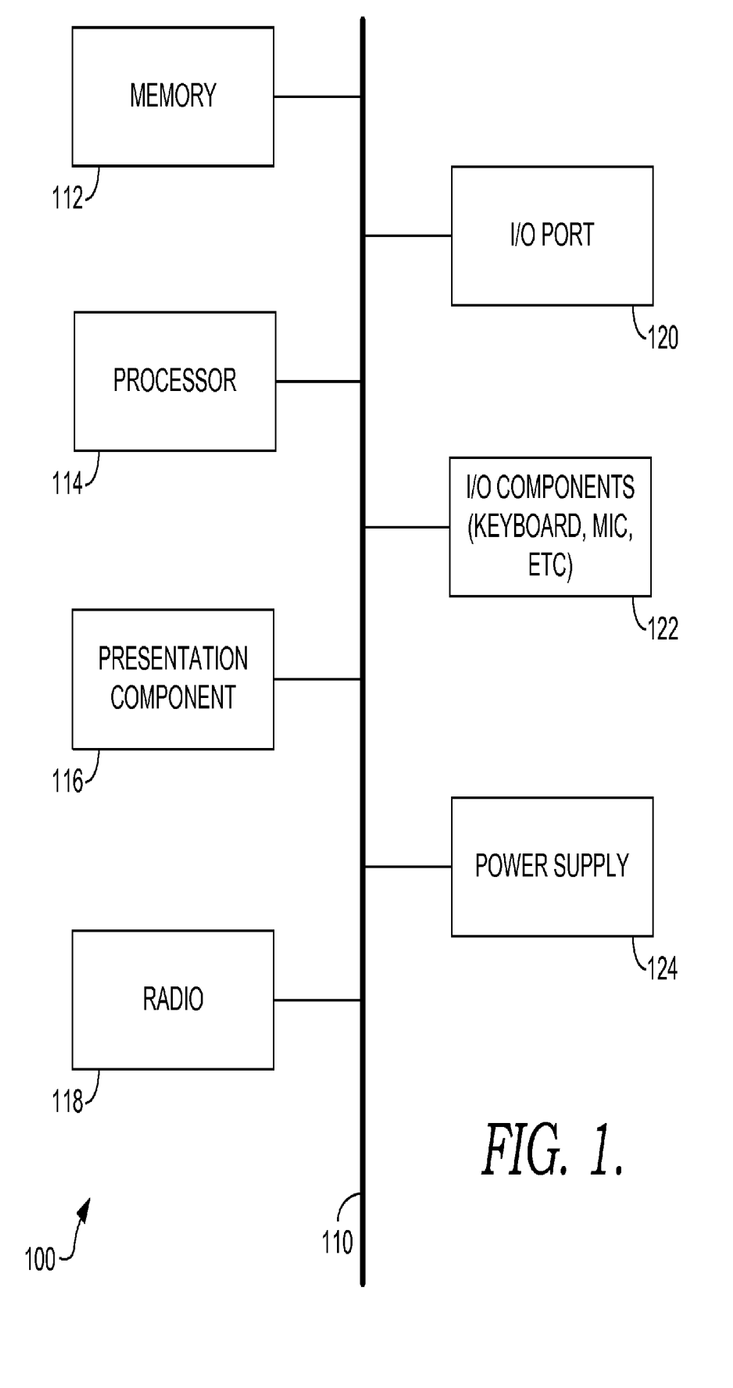
FIG. 1 depicts a block diagram of an illustrative mobile computing device suitable for use with an embodiment of the invention.

Referring now to FIG. 1, a block diagram of an illustrative mobile computing device ("mobile device") is provided and is generally referred to as mobile device 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 118, input/output ports 120, input/output components 122, and a power supply 124.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or even lighted keyboards).

Radio 118 represents a radio that facilitates communication with a wireless telecommunications network. Illustrative wireless telecommunications technologies include LTE, CDMA, GPRS, TDMA, GSM, EVDO, and the like. In some embodiments, radio 118 might also facilitate other types of wireless communications including Wi-Fi communications and GIS communications.

Input/output port 120 might take on a variety of forms. Illustrative input/output ports include a USB jack, stereo jack, infrared port, proprietary communications ports, and the like. Input/output components 122 include items such as keyboards, microphones, touch screens, and any other item usable to directly or indirectly input data into mobile device 100. Power supply 124 includes items such as batteries, fuel cells, or any other component that can act as a power source to power mobile device 100.

Figure 2:
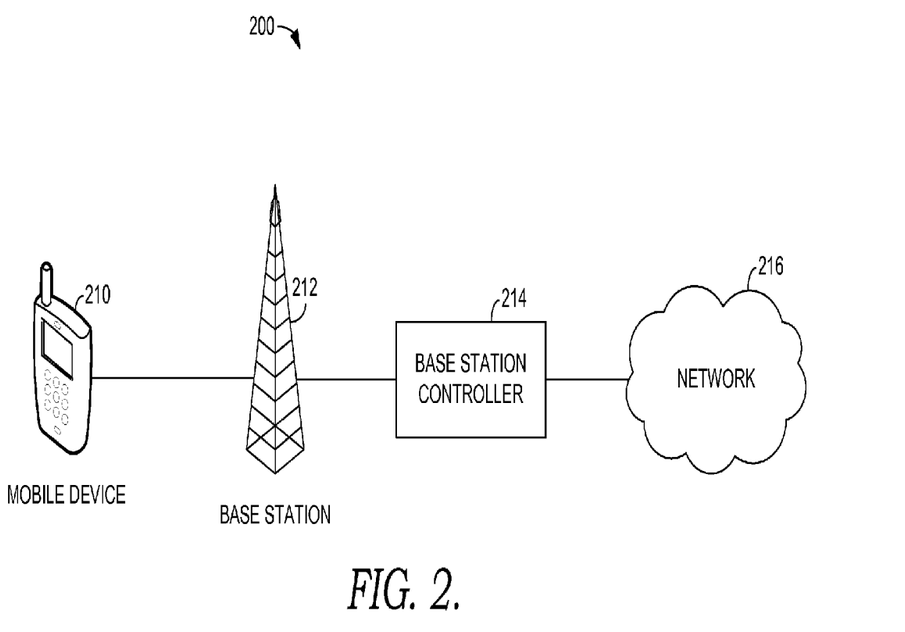
FIG. 2 depicts an illustrative network environment suitable for use with an embodiment of the invention.

Referring now to FIG. 2, an illustrative network environment suitable for use with an embodiment of the invention is depicted and is generally referred to as network environment 200. Network environment 200 is but one example of a suitable network environment, and includes a mobile device 210, a base station (BS) 212, a base station controller (BSC) 214, and a network 216. Some embodiments of network environment 200 include an alternative configuration. For example, while a CDMA network environment may include BSC 214, an LTE network environment may include a serving gateway (SGW) and packet data network gateway (PGW) instead of BSC 214. Although elements of network environment 200 are shown in the singular, elements of network environment 200 may be plural. For example, network environment 200 may include multiple mobile devices and BSs.

An exemplary mobile device 210 includes a cell phone. Other examples of mobile device 210 include personal digital assistants (PDAs), wireless-enabled laptop computers, gaming systems, electronic books, and other devices as described above regarding mobile device 100 of FIG. 1 that are capable of connecting with BS 212.

BS 212 enables mobile device 210 to communicate with network 216, and may include a tower, one or more antennas, and one or more radio receivers. In some cases, BS 212 may not include an actual tower; for example, antennas may be mounted on top of buildings or other structures, or in other locations, in lieu of being mounted on a tower. By way of example, third-generation cellular technologies, such as Code Division Multiple Access-Evolution-Data Optimized (CDMA-EVDO) could be used to connect mobile device 210 to BS 212. IEEE 802.11 wireless links could also be used to connect mobile device 210 to BS 212. However, BS 212 is not limited to those particular technologies.

BS 212 is controlled by BSC 214, which handles allocation of radio channels, receives measurements from mobile devices, and controls handovers of mobile devices from one BS to another. A BSC typically manages multiple BSs such as BS 212.

Figure 3:
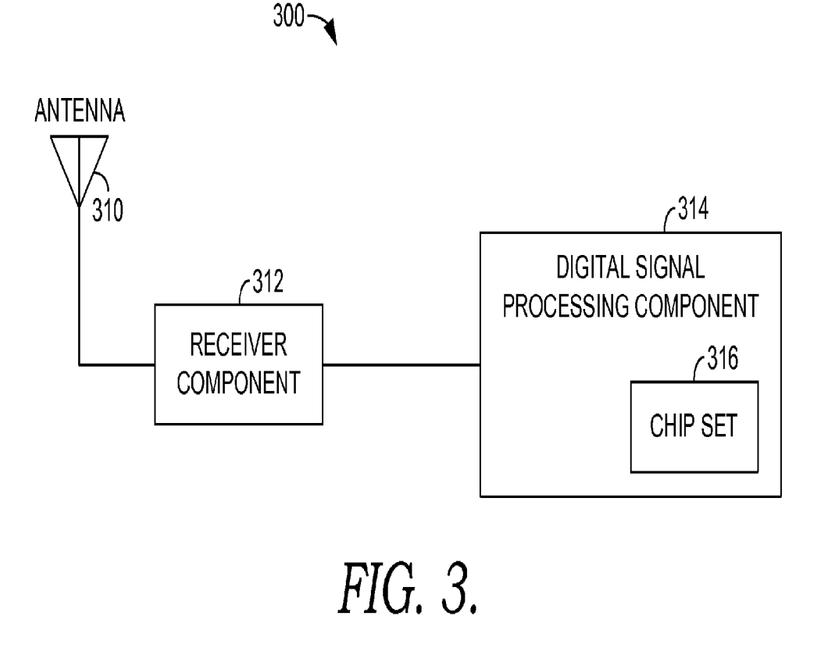
FIG. 3 depicts a block diagram of an illustrative base station suitable for use with an embodiment of the invention.

Referring now to FIG. 3, a block diagram of an exemplary BS 300 is depicted. BS 300 is merely an example of one suitable BS and is not intended to suggest any limitation as to the scope of use or functionality of embodiments of the invention. Neither should BS 300 be interpreted as having any dependency or requirement relating to any single component or combination of components illustrated therein. FIG. 3 will be discussed with reference to FIG. 2. BS 300 may function as described above with regard to BS 212, and includes an antenna 310, a receiver component 312, and a digital signal processing component 314, which includes a chip set 316. Although elements of BS 300 are shown in the singular, elements of BS 300 may be plural. For example, antenna 310 may include a plurality of antennas, or may be an antenna array comprising a plurality of antenna elements. Antenna 310 receives a signal from a mobile device, such as mobile device 210 described above, and provides the uplink signal to receiver component 312. Receiver component 312, which includes one or more receivers, demodulates the received signal. Chip set 316 receives the demodulated signal from receiver component 312 and provides digital processing to further decode the signal.

In an embodiment, BS 300 employs a technique referred to as beam forming, and antenna 310 comprises an antenna array configured for beam forming a downlink signal. At a high level, beam forming utilizes multiple antennas (or multiple elements in an antenna array) to maximize signal power in the direction of a mobile device (or other user equipment capable of communicating via BS 300). Signal power is maximized or optimized by adjusting the phase and amplitude of the downlink transmission beam from each antenna element. Through constructive and destructive interferences of the plurality of signals transmitted by the plurality of antenna elements, the signal strength received at different directions from the base station varies. The beam pattern that results from this constructive and destructive interference is comprised of lobes and nulls. As such, a lobe or beam associated with the antenna array comprises radio waves or signals emitted and/or received in a particular direction or angle. The primary lobe, which is the strongest, is emitted in a desired direction. A transmission beam generated through beam forming is generally narrower and has a longer range (due to increased directed power) than transmissions produced without beam forming, thereby helping to reduce interference at the mobile device. As described above, beam forming requires that the transmitting antennas (or elements in an antenna array) be spaced closely enough that the output signals are correlated. A spacing of one-half of the wavelength of the carrier signal (or $\lambda/2$, where $\lambda$ is the wavelength) is considered to be an optimal spacing for use with beam forming. As the spacing increases beyond $\lambda/2$, the side lobes grow larger and the power contained in the primary lobe decreases.

In an embodiment, BS 300 also employs a technique referred to as multiple-input and multiple-output (MIMO). As with beam forming, MIMO utilizes multiple antennas at the base station. MIMO can include a technique referred to as receive diversity, or antenna diversity, to improve the quality and reliability of an uplink signal. For example, receive diversity can minimize the effects of interference on an uplink signal received from mobile device 210. Multipath interference may occur when multiple versions of the signal, which may result from the signal being reflected along multiple paths before being received, destructively interfere with each other at the receiving antenna. Two or more antennas spaced at a distance from each other will receive different versions of the signal transmitted by mobile device 210, as long as the spacing is great enough that the received signals are uncorrelated with each other. The signals received at each antenna may be combined or selected by digital signal processing component 314 using various techniques to minimize the effects of the interference observed at each antenna element. Exemplary techniques for utilizing the signals from each antenna element include, among others, using the best quality uplink signal from a single antenna element, or combining the multiple uplink signals from the antenna elements into a single uplink signal. One example of combining is maximum-ratio combining, in which the signals are summed after having been phase corrected and weighted according to their signal-to-noise ratios. Receive diversity may also use other techniques for utilizing, or combining, the signals from multiple antennas.

Various numbers of uplink signals may be combined using n-branch combining techniques, where n is the number of branches. Although in principle n-branch combining is not limited to any particular number of branches, as the number of branches, or antenna elements, is increased, a greater amount of resources is required to process and combine the greater number of signals. For example, two-branch and four-branch combining are often used, in which two-branch receive diversity utilizes signals from two antennas, and four-branch receive diversity utilizes signals from four antennas. Increasing the number of elements in the antenna array can improve uplink performance, enabling greater coverage to be achieved through better reception of signals from mobile devices at the edge of a cell. For example, eight-branch combining may be desirable to provide better reception or coverage than four-branch combining, but would require additional resources as described above.

Figure 4:
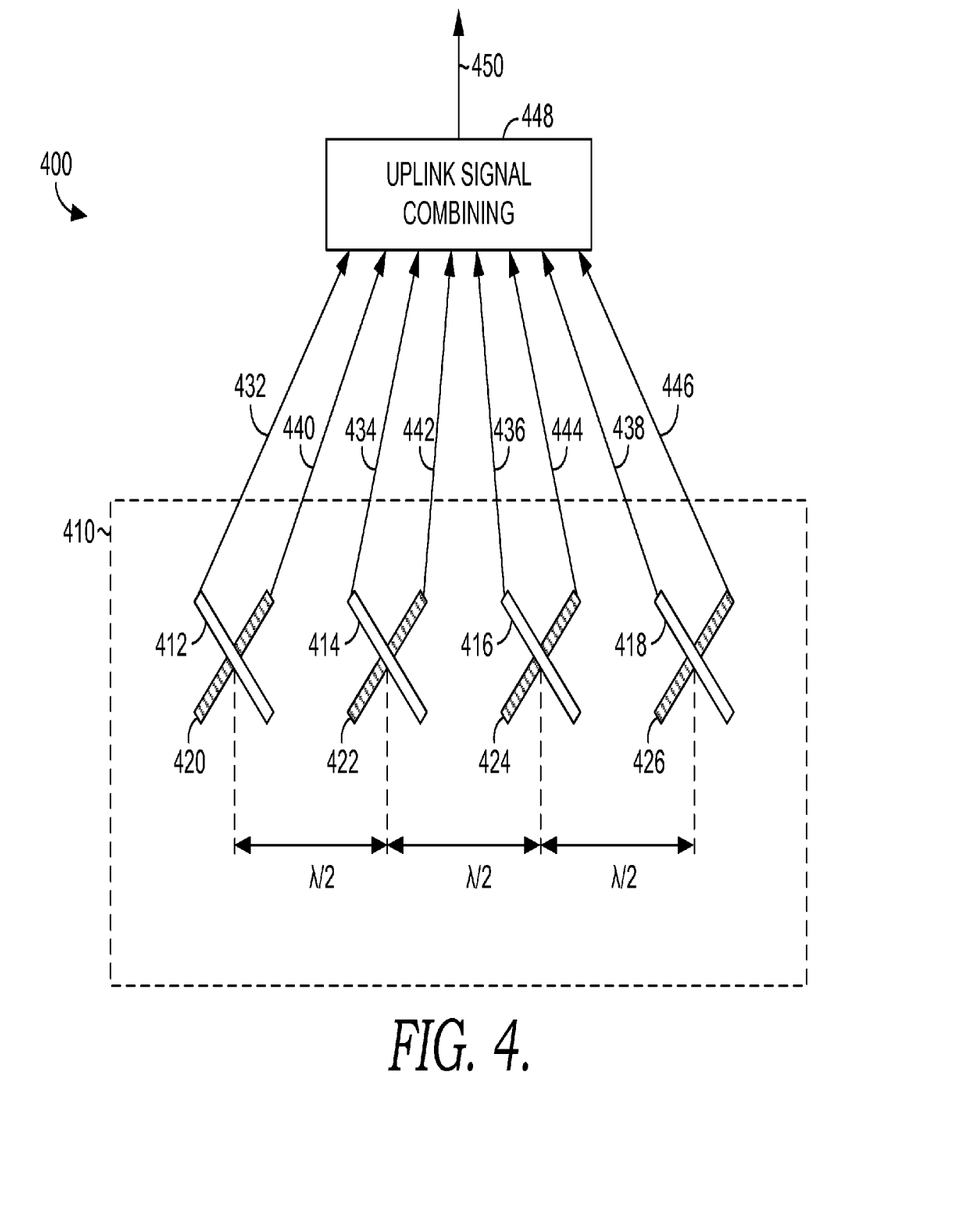
FIG. 4 depicts a representation of a system for combining uplink signals suitable for use with an embodiment of the invention.

FIG. 4 depicts a representation of a system for combining uplink signals suitable for use with an embodiment of the invention, and is generally referred to as receive system 400. Receive system 400 is merely an example of one suitable receive system and is not intended to suggest any limitation as to the scope of use or functionality of embodiments of the invention. Neither should receive system 400 be interpreted as having any dependency or requirement relating to any single component or combination of components illustrated therein. Receive system 400 as depicted is a simplified representation of some portions and functions of a base station, such as base station 300 described above, and is not intended to represent all components or functions of a base station.

In an embodiment, receive system 400 includes an antenna array 410, which consists of eight antenna elements 412, 414, 416, 418, 420, 422, 424, and 426. The antenna elements may be configured as four sets of cross-polarized (X-pol) dipoles, as depicted. Each set of X-pol dipoles as shown in FIG. 4 may represent a column of X-pol dipoles in antenna array 410, in which elements within the column having the same polarization are electrically connected and function as a single element. For example, element 412 may represent a column of dipoles, having the same polarization, that are electrically connected. In an embodiment, antenna array 410 is configured for downlink beam forming, as depicted, i.e., the spacing between each set of X-pol dipoles is λ/2, which is one-half the carrier wavelength. The spacing of λ/2, as described above, is advantageous for downlink beam forming but not for combining uplink signals.

The respective uplink signals 432, 434, 436, 438, 440, 442, 444, and 446 from antenna elements 412, 414, 416, 418, 420, 422, 424, and 426 are combined in a combining module 448 into a single signal 450. Combining module 448 as depicted is functional in nature, and is not intended to depict a specific configuration of hardware or processing devices. Although shown as a single module, combining module 448 may consist of multiple modules or components, including processors, digital signal processors, and other electronic and electrical components. Combining module 448 may be physically constructed as a single device or item of equipment, or the functions of combining module 448 may be distributed among a plurality of devices or items of equipment. Combining module 448 may be incorporated into one or more receivers or other devices, or may be implemented as a separate device or devices.

In an embodiment, combining module 448 comprises or utilizes one or more digital signal processing components, similar to digital signal processing component 314 described above with regard to FIG. 3, which may utilize any of a number of diversity receive techniques to combine the uplink signals into a single signal. In an embodiment, combining module 448 utilizes maximum ratio combining to combine the eight uplink signals. However, as described above, eight-branch maximum ratio combining is resource-intensive as compared with two-branch and four-branch combining, which may be typically employed when utilizing two-element or four element antennas, respectively. In an embodiment, maximum ratio combining is employed with the eight-element antenna array 410, but without having to perform eight-branch combining, as described below. The need for additional resources normally associated with eight-branch maximum ratio combining is thus avoided.

Figure 5:
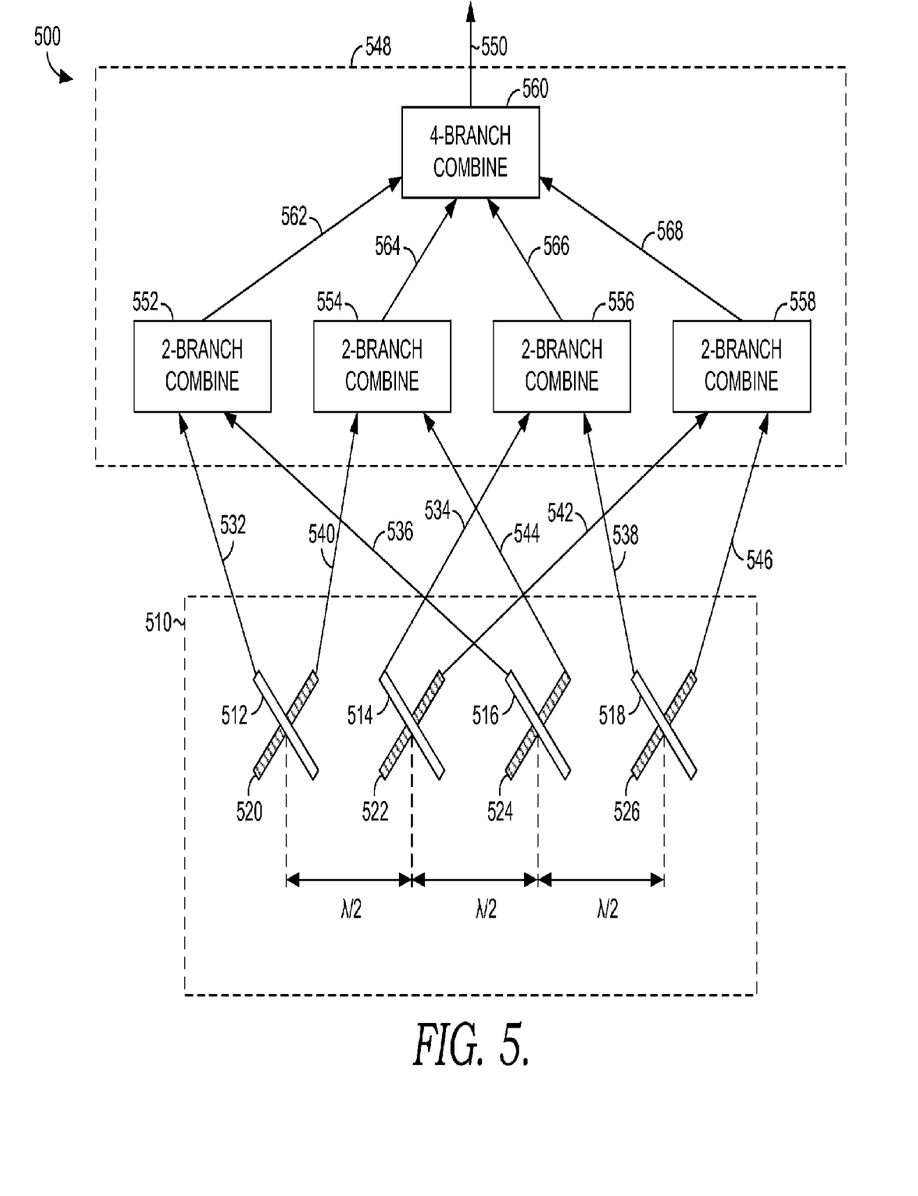
FIG. 5 depicts a representation of a system for combining uplink signals suitable for use with an embodiment of the invention.

FIG. 5 depicts a representation of a system for combining uplink signals suitable for use with an embodiment of the invention, and is generally referred to as receive system 500. Receive system 500 is merely an example of one suitable receive system and is not intended to suggest any limitation as to the scope of use or functionality of embodiments of the invention. Neither should receive system 500 be interpreted as having any dependency or requirement relating to any single component or combination of components illustrated therein. Receive system 500 as depicted is a simplified representation of some portions and functions of a base station, such as base station 212 described above, and is not intended to represent all components and functions of a base station when receiving and processing uplink signals.

In an embodiment, receive system 500 includes an antenna array 510, which consists of eight antenna elements 512, 514, 516, 518, 520, 522, 524, and 526, similar to antenna array 410 described above with regard to FIG. 4. The antenna elements may be configured as four sets of cross-polarized (X-pol) dipoles, as depicted. Each set of X-pol dipoles as shown in FIG. 5 may represent a column of X-pol dipoles in antenna array 510, in which elements within the column having the same polarization are electrically connected and function as a single element. For example, element 512 may represent a column of dipoles, having the same polarization, that are electrically connected. In an embodiment, antenna array 510 is configured for downlink beam forming, as depicted, i.e., the spacing between each set of X-pol dipoles is λ/2, which is one-half the carrier wavelength. The spacing of λ/2, as described above, is advantageous for downlink beam forming but not for combining uplink signals. In some embodiments, the spacing between each set of X-pol dipoles is 0.65λ.

As in receive system 400 described above, the respective uplink signals 532, 534, 536, 538, 540, 542, 544, and 546 from antenna elements 512, 514, 516, 518, 520, 522, 524, and 526 are combined in a combining module 548 into a single signal 550. Combining module 548 as depicted is functional in nature, and is not intended to depict a specific configuration of hardware or processing devices. Combining module 448 may consist of a single or multiple modules or components, including processors, digital signal processors, and other electronic and electrical components. Combining module 548 may be physically constructed as a single device or item of equipment or the functions of combining module 548 may be distributed among a plurality of devices or items of equipment. Combining module 548 may be incorporated into one or more receivers or other devices, or may be implemented as a separate device or devices.

In an embodiment, combining module 548 comprises or utilizes one or more digital signal processing components, similar to digital signal processing component 314 described above with regard to FIG. 3, which may utilize combinations of both two-branch combining and four-branch combining to combine the eight uplink signals into a single signal. The two-branch combining and four-branch combining may each be performed using maximum ratio combining, but without performing eight-branch combining, as described below. The need for additional resources normally associated with eight-branch maximum ratio combining is thus avoided. Additionally, better utilization of antenna array 510, which is configured for downlink beam forming, may be achieved during uplink reception. An appropriate selection of which signals are combined at each stage results in combinations of uncorrelated signals, as described below, which is preferred for uplink receive diversity.

With continued reference to FIG. 5, in an embodiment, combining module 548 includes two-branch combining modules 552, 554, 556, and 558, and a four-branch combining module 560. Pairs of the uplink signals 532, 534, 536, 538, 540, 542, 544, and 546, from antenna elements 512, 514, 516, 518, 520, 522, 524, and 526, are first combined using two-branch combining in modules 552, 554, 556, and 558, then the four resultant two-branch-combined signals are combined using four-branch combining in four-branch combining module 560. However, in an embodiment, the particular signals selected in each pair for two-branch combining are chosen such that they are uncorrelated with each other. With reference to antenna array 510, the spacing between adjacent sets of X-pol dipoles is λ/2. Thus, antenna elements 512 and 514 are spaced at a distance of one-half the carrier wavelength, which is not optimal for uplink receive diversity combining. On the other hand, antenna elements 512 and 516 are spaced at a distance of 2×(λ/2)=λ, which is a full wavelength. Thus, the uplink signals 532 and 536 received by antenna elements 512 and 516 are uncorrelated, which is desired for uplink receive diversity combining. In other words, the spacing between every other antenna element is one wavelength, thus the signals received at every other antenna element are uncorrelated. Additionally, in an embodiment the particular signals selected in each pair are chosen such that the pairs are non-overlapping, i.e., no two pairs share a common uplink signal.

Uplink signals 532 and 536 are combined in two-branch combining module 552 to provide a resultant two-branch combined signal 562. Similarly, other pairs of uncorrelated uplink signals may be combined at each of the other two-branch combining modules. As depicted, uplink signals 540 and 544 are combined in two-branch combining module 554, uplink signals 534 and 538 are combined in two-branch combining module 556, and uplink signals 542 and 546 are combined in two-branch combining module 558. As illustrated in FIG. 5, the uplink signals in each two-branch-combined pair are received at antenna elements spaced at a distance of one wavelength, thus the signals in any given pair are uncorrelated with each other as described above. The four resultant two-branch-combined signals 562, 564, 566, and 568, are combined in four-branch combining module 560 to provide a resultant four-branch-combined signal 550. Thus, the eight uplink signals are ultimately combined into a single uplink signal. Although described herein in terms of an eight-element antenna array, some embodiments are not limited to using an 8-element array.

In an embodiment, receive system 500 is configured to switch dynamically between the 2-branch/n-branch combining technique described above and a different configuration for combining the uplink signals. For example, electronic switching might be utilized to reconfigure the uplink signals 532, 534, 536, 538, 540, 542, 544, and 546 such they are combined in a different manner. For example, the uplink signals might be combined in a single step with eight-branch combining, utilizing maximum ratio combining or another type of combining or selection technique. Examples of other combining techniques include selecting the best quality uplink signal from a single antenna, or using an eight-branch interference rejection combining (IRC) technique, among others. Switching between the 2-branch/n-branch combining described above and a different antenna element configuration may be based on a measured reference signal receive power (RSRP) threshold. The RSRP threshold may be configured by a system operator to define the cell edge RSRP, such that the configuration for combining the uplink signals may be selected based on the proximity of a mobile device to the cell edge. For example, in one embodiment a mobile device may measure the RSRP level and report the measurement to the base station, and as long as the RSRP level is above a certain threshold, say −100 dBm, a typical combining or selection technique may be used, and when the RSRP level becomes worse than −100 dBm, then the base station may dynamically switch to the 2-branch/n-branch configuration described above which provides improved cell coverage.

Figure 6:
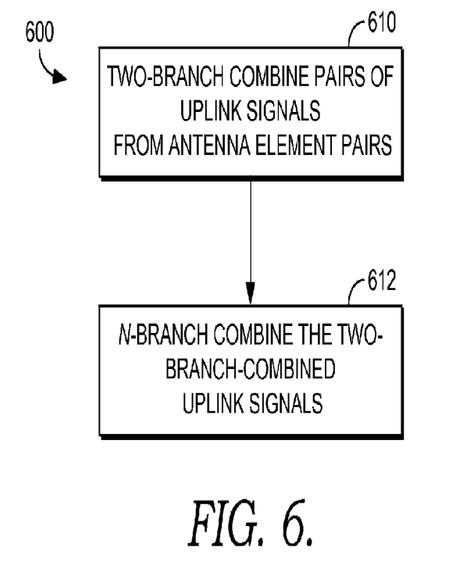
FIG. 6 depicts an exemplary method suitable for use with an embodiment of the invention.

FIG. 6 depicts an exemplary method suitable for use with an embodiment of the invention, and is generally referred to as method 600. Method 600 is merely an example of one suitable method and is not intended to suggest any limitation as to the scope of use or functionality of embodiments of the invention. Neither should method 600 be interpreted as having any dependency or requirement relating to any single step or combination of steps illustrated therein.

In an embodiment, method 600 is utilized in conjunction with multiple antennas or an antenna array comprising multiple elements which may be physically configured for downlink beam forming. In an embodiment, for beam forming the elements are spaced apart at a distance of $\lambda/2$ or $0.65\lambda$, where $\lambda$ is the wavelength of the uplink/downlink carrier. The elements in the antenna array, which receive uplink signals from a mobile device, may be logically grouped into unique pairs such that each element pair contains two non-adjacent elements which each receive a version of an uplink signal from the mobile device. Additionally, the pairs may be non-overlapping pairs, i.e., no two pairs share a common element. At a step 610, for each of the element pairs, two-branch combining is utilized to combine the uplink signals from the elements within the element pair, which provides a plurality of resultant two-branch-combined uplink signals that correspond respectively to the element pairs. For example, in one embodiment, if the antenna array has eight elements, there are eight uplink signals received from the mobile device. The eight uplink signals may be grouped into four pairs, and each pair of signals combined, resulting in four signals. The two-branch combining may be a two-branch receive diversity technique. One example of a two-branch receive diversity technique that may be used is maximum ratio combining.

At a step 612, n-branch combining is utilized to combine the resultant two-branch-combined uplink signals into a single resultant uplink signal, where n is the number of element pairs. For example, in one embodiment, if the antenna array has eight elements, there are four resultant two-branch-combined uplink signals, as described above. Four-branch combining is then utilized to combine the four resultant two-branch-combined uplink signals. In an embodiment, the n-branch combining comprises an n-branch receive diversity technique. One example of an n-branch receive diversity technique that may be used is maximum ratio combining.

Figure 7:
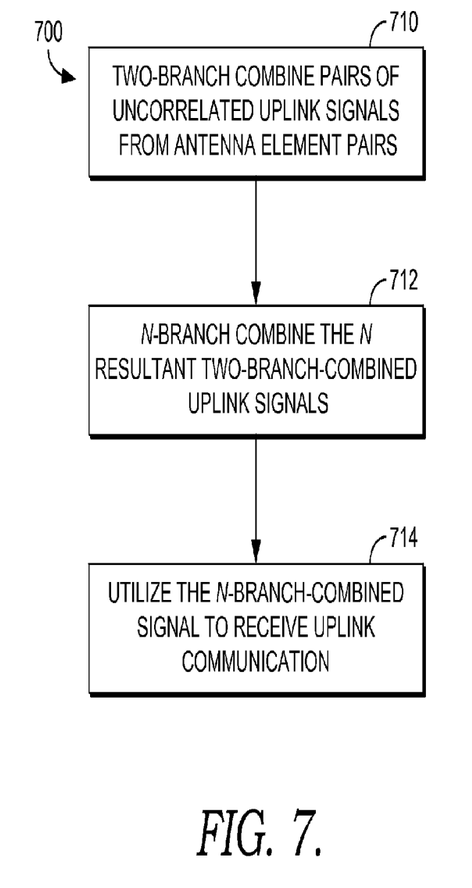
FIG. 7 depicts an exemplary method suitable for use with an embodiment of the invention.

FIG. 7 depicts an exemplary method suitable for use with an embodiment of the invention, and is generally referred to as method 700. Method 700 is merely an example of one suitable method and is not intended to suggest any limitation as to the scope of use or functionality of embodiments of the invention. Neither should method 700 be interpreted as having any dependency or requirement relating to any single step or combination of steps illustrated therein.

In an embodiment, method 700 is utilized in conjunction with multiple antennas or an antenna array comprising multiple elements which may be physically configured for downlink beam forming. In an embodiment, for beam forming the elements are spaced apart at a distance of $\lambda/2$ or $0.65\lambda$, where $\lambda$ is the wavelength of the uplink/downlink carrier, resulting in downlink signals from adjacent elements that are correlated. Additionally, with a spacing configured for downlink beam forming, the signals received at adjacent elements will also be correlated. The elements in the antenna array, which receive uplink signals from a mobile device, may be logically grouped into unique pairs such that each element pair contains two non-adjacent elements which each receive an uplink signal from the mobile device. Because the elements within a pair are non-adjacent, the spacing between them will be greater than $\lambda/2$ or $0.65\lambda$, thus the signals received by the elements in the pair will be uncorrelated. Additionally, the pairs may be non-overlapping pairs, i.e., no two pairs share a common antenna element. At a step 710, for each of the element pairs, two-branch combining is utilized to combine the uncorrelated uplink signals from the elements within the element pair, which provides a plurality of resultant two-branch-combined uplink signals that correspond respectively to the element pairs. For example, in one embodiment, if the antenna array has eight elements, there are eight uplink signals received from the mobile device. The eight uplink signals may be grouped into four pairs, and each pair of signals combined, resulting in four signals. One example of two-branch combining that may be used is maximum ratio combining.

At a step 712, n-branch combining is utilized to combine the resultant two-branch-combined uplink signals into a single resultant n-branch-combined signal, where n is the number of element pairs. For example, in one embodiment, if the antenna array has eight elements, there are four resultant two-branch-combined uplink signals, as described above. Four-branch combining is then utilized to combine the four resultant two-branch-combined uplink signals. In an embodiment, the n-branch combining comprises n-branch maximum ratio combining. At a step 714, the resultant n-branch-combined signal is utilized to receive uplink communication.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for combining uplink signals received via an antenna array that includes a plurality of elements, the method comprising:
   for each of a plurality of element pairs within the antenna array, wherein each element pair contains two non-adjacent elements separated by a single element within the antenna array, wherein each element in the element pair receives an uplink signal, utilizing two-branch combining to combine the uplink signals from the elements within the element pair, thereby providing a resultant two-branch-combined uplink signal for each of the plurality of element pairs; and
   utilizing n-branch combining to combine the resultant two-branch-combined uplink signals, wherein n is finite and corresponds to the number of element pairs within the antenna array.

2. The method of claim 1, wherein the n-branch combining of the resultant two-branch-combined signals is utilized to combine the resultant two-branch-combined signals into a single resultant uplink signal.

3. The method of claim 1, wherein the uplink signals are received via the antenna array that is physically configured for down-link beam forming.

4. The method of claim 3, wherein the antenna array that is physically configured for down-link beam forming comprises the elements spaced at a distance of $\lambda/2$ or $0.65\lambda$, wherein $\lambda$ is the wavelength of a carrier signal associated with the uplink signals.

5. The method of claim 1, wherein the two-branch combining comprises a two-branch receive diversity technique and the n-branch combining comprises an n-branch receive diversity technique.

6. The method of claim 1, wherein the two-branch combining comprises maximum ratio combining.

7. The method of claim 1, wherein the n-branch combining comprises maximum ratio combining.

8. The method of claim 1, wherein the element pairs are non-overlapping element pairs.

9. The method of claim 1, wherein the antenna array includes at least eight elements.

10. A system for combining uplink signals received via an antenna array that includes a plurality of elements, comprising:
    an antenna array that includes a plurality of element pairs, wherein each element pair contains two non-adjacent elements separated by a single element within the antenna array, and wherein each element is configured to receive an uplink signal; and
    a combining module configured to
    A) for each element pair, utilize two-branch combining to combine the uplink signals from the elements within the element pair, thereby providing a resultant two-branch-combined uplink signal for each of the plurality of element pairs; and
    B) utilize n-branch combining to combine the resultant two-branch-combined uplink signals, wherein n is finite and corresponds to the number of element pairs within the antenna array.

11. The system of claim 10, wherein the n-branch combining of the resultant two-branch-combined signals is utilized to combine the resultant two-branch-combined signals into a single resultant uplink signal.

12. The system of claim 10, wherein the uplink signals are received via the antenna array that is physically configured for down-link beam forming.

13. The system of claim 12, wherein the antenna array that is physically configured for down-link beam forming comprises the elements spaced at a distance of $\lambda/2$ or $0.65\lambda$, wherein $\lambda$ is the wavelength of a carrier signal associated with the uplink signals.

14. The system of claim 10, wherein the two-branch combining comprises a two-branch receive diversity technique and the n-branch combining comprises an n-branch receive diversity technique.

15. The system of claim 10, wherein the two-branch combining comprises maximum ratio combining.

16. The system of claim 10, wherein the n-branch combining comprises maximum ratio combining.

17. The system of claim 10, wherein the element pairs are non-overlapping element pairs.

18. The system of claim 10, wherein the antenna array includes at least eight elements.

* * * * *